United States Patent
Sahadi et al.

(10) Patent No.: US 9,813,855 B2
(45) Date of Patent: Nov. 7, 2017

(54) TARGETED VENUE MESSAGE DISTRIBUTION

(71) Applicant: Blazer and Flip Flops, Inc., San Diego, CA (US)

(72) Inventors: Scott Sebastian Sahadi, Solana Beach, CA (US); Benjamin Harry Ziskind, San Diego, CA (US); Jannis Raye Brea, San Diego, CA (US)

(73) Assignee: BLAZER AND FLIP FLOPS, INC., San Diego, CA (US)

( * ) Notice: Subject to any disclaimer, the term of this patent is extended or adjusted under 35 U.S.C. 154(b) by 0 days.

(21) Appl. No.: 15/138,157

(22) Filed: Apr. 25, 2016

(65) Prior Publication Data

US 2016/0316324 A1    Oct. 27, 2016

Related U.S. Application Data

(60) Provisional application No. 62/151,885, filed on Apr. 23, 2015.

(51) Int. Cl.
*H04W 4/02* (2009.01)
*H04W 4/12* (2009.01)

(52) U.S. Cl.
CPC ............ *H04W 4/02* (2013.01); *H04W 4/021* (2013.01); *H04W 4/12* (2013.01)

(58) Field of Classification Search
CPC .............................. H04W 4/12; H04W 4/021
See application file for complete search history.

(56) References Cited

U.S. PATENT DOCUMENTS

| 4,873,513 A | 10/1989 | Soults et al. |
| 5,978,744 A | 11/1999 | McBride |

(Continued)

FOREIGN PATENT DOCUMENTS

| WO | WO 2011/159811 | 12/2011 |
| WO | WO 2013/163444 | 10/2013 |

(Continued)

OTHER PUBLICATIONS

Feng et al., Yue ; "Effective venue image retrieval using robust feature extraction and model constrained matching for mobile robot localization", Machine Vision and Applications, DOI 10.1007/s00138-011-0350-z, Oct. 28, 2010.

(Continued)

*Primary Examiner* — Asghar Bilgrami
(74) *Attorney, Agent, or Firm* — Polsinelli LLP

(57) ABSTRACT

An application server may receive, from an administrative console, a message and a targeting specification. The targeting specification identifies at least one trait (e.g., ticket type, age, gender) shared by a group of targeted venue guests. The group of targeted venue guests is a subset of the plurality of venue guests of a venue. The application server then uses information obtained from venue guest devices corresponding to venue guests to identify who belongs to the group targeted venue guests as well as their corresponding targeted venue guest devices. The application server then transmits a message to the targeted venue guest devices. The message may further be transmitted according to a schedule set or triggers by the administrator console. The schedule may identify dates and times within which messages should be sent, while the triggers may identify locations that may trigger messages.

20 Claims, 7 Drawing Sheets

(56) References Cited

U.S. PATENT DOCUMENTS

| | | | |
|---|---|---|---|
| 6,142,368 A | 11/2000 | Mullins et al. | |
| 6,223,559 B1 | 5/2001 | Coleman | |
| 6,320,496 B1 | 11/2001 | Sokoler et al. | |
| 6,352,205 B1 | 3/2002 | Mullins et al. | |
| 6,414,635 B1 | 7/2002 | Stewart et al. | |
| 6,474,557 B2 | 11/2002 | Mullins et al. | |
| 6,493,630 B2 | 12/2002 | Ruiz et al. | |
| 6,587,787 B1 | 7/2003 | Yokota | |
| 6,663,006 B2 | 12/2003 | Mullins et al. | |
| 6,687,608 B2 | 2/2004 | Sugimoto et al. | |
| 6,997,380 B2 | 2/2006 | Safaei et al. | |
| 7,222,080 B2 | 5/2007 | Hale et al. | |
| 7,558,678 B2 | 7/2009 | Jones | |
| 7,992,773 B1 | 8/2011 | Rothschild | |
| 8,368,695 B2 | 2/2013 | Howell et al. | |
| 8,424,752 B2 | 4/2013 | Rothschild | |
| 8,427,510 B1 | 4/2013 | Towfiq et al. | |
| 8,433,342 B1 | 4/2013 | Boyle et al. | |
| 8,625,796 B1 | 1/2014 | Ben Ayed | |
| 8,651,369 B2 | 2/2014 | Rothschild | |
| 8,936,190 B2 | 1/2015 | Rothschild | |
| 9,485,322 B2* | 11/2016 | Krishnaswamy | G06F 17/30867 |
| 9,488,085 B2 | 11/2016 | Crawford et al. | |
| 9,741,022 B2 | 8/2017 | Ziskind | |
| 2002/0029226 A1 | 3/2002 | Li et al. | |
| 2002/0055863 A1 | 5/2002 | Behaylo | |
| 2003/0007464 A1 | 1/2003 | Balani | |
| 2004/0224703 A1 | 11/2004 | Takaki et al. | |
| 2006/0074550 A1* | 4/2006 | Freer | G06Q 30/02 701/533 |
| 2006/0087474 A1 | 4/2006 | Do et al. | |
| 2006/0106850 A1 | 5/2006 | Morgan et al. | |
| 2007/0032269 A1 | 2/2007 | Shostak | |
| 2007/0174115 A1 | 7/2007 | Chieu et al. | |
| 2007/0197247 A1 | 8/2007 | Inselberg | |
| 2007/0270166 A1* | 11/2007 | Hampel | H04L 12/5865 455/456.3 |
| 2008/0059889 A1 | 3/2008 | Parker et al. | |
| 2008/0183582 A1 | 7/2008 | Major | |
| 2008/0186164 A1 | 8/2008 | Emigh et al. | |
| 2008/0290182 A1 | 11/2008 | Bell et al. | |
| 2008/0306826 A1 | 12/2008 | Kramer et al. | |
| 2009/0017798 A1* | 1/2009 | Pop | H04W 4/008 455/414.1 |
| 2009/0027418 A1 | 1/2009 | Maru et al. | |
| 2009/0089131 A1* | 4/2009 | Moukas | G06Q 10/0631 705/70 |
| 2009/0265428 A1 | 10/2009 | Light et al. | |
| 2009/0319306 A1 | 12/2009 | Chanick | |
| 2010/0037141 A1 | 2/2010 | Carter et al. | |
| 2010/0042320 A1 | 2/2010 | Salmre et al. | |
| 2010/0077036 A1 | 3/2010 | DeLuca et al. | |
| 2010/0161432 A1 | 6/2010 | Kumanov et al. | |
| 2010/0194784 A1 | 8/2010 | Hoff et al. | |
| 2011/0054976 A1 | 3/2011 | Adler et al. | |
| 2011/0078026 A1 | 3/2011 | Durham | |
| 2011/0090123 A1 | 4/2011 | Sridhara et al. | |
| 2011/0136507 A1 | 6/2011 | Hauser et al. | |
| 2011/0173545 A1 | 7/2011 | Meola | |
| 2011/0221745 A1 | 9/2011 | Golman et al. | |
| 2011/0246148 A1 | 10/2011 | Gupta et al. | |
| 2011/0267369 A1 | 11/2011 | Olsen et al. | |
| 2012/0024947 A1 | 2/2012 | Naelon | |
| 2012/0069131 A1* | 3/2012 | Abelow | G06Q 10/067 348/14.01 |
| 2012/0081250 A1 | 4/2012 | Farrokhi et al. | |
| 2012/0096490 A1* | 4/2012 | Barnes, Jr. | G06Q 10/02 725/34 |
| 2012/0166960 A1 | 6/2012 | Salles | |
| 2012/0172055 A1 | 7/2012 | Edge | |
| 2012/0214515 A1 | 8/2012 | Davis et al. | |
| 2012/0239504 A1 | 9/2012 | Curlander et al. | |
| 2012/0270573 A1 | 10/2012 | Marti et al. | |
| 2012/0271691 A1* | 10/2012 | Hammad | G06Q 30/02 705/14.17 |
| 2012/0274642 A1 | 11/2012 | Ofek et al. | |
| 2012/0284117 A1 | 11/2012 | Karandikar | |
| 2013/0024265 A1 | 1/2013 | Lotzof | |
| 2013/0036455 A1 | 2/2013 | Bodi et al. | |
| 2013/0052990 A1 | 2/2013 | Zhang | |
| 2013/0059603 A1 | 3/2013 | Guenec et al. | |
| 2013/0085834 A1 | 4/2013 | Witherspoon et al. | |
| 2013/0132230 A1 | 5/2013 | Gibson et al. | |
| 2013/0137464 A1 | 5/2013 | Kramer et al. | |
| 2013/0157655 A1 | 6/2013 | Smith et al. | |
| 2013/0158867 A1 | 6/2013 | Sidhu et al. | |
| 2013/0173377 A1 | 7/2013 | Keller et al. | |
| 2013/0191213 A1 | 7/2013 | Beck et al. | |
| 2013/0225282 A1 | 8/2013 | Williams et al. | |
| 2013/0231135 A1 | 9/2013 | Garskof | |
| 2013/0267260 A1 | 10/2013 | Chao et al. | |
| 2013/0281084 A1 | 10/2013 | Batada et al. | |
| 2013/0317944 A1 | 11/2013 | Huang et al. | |
| 2013/0339073 A1 | 12/2013 | Dabbiere | |
| 2014/0025466 A1 | 1/2014 | Borton et al. | |
| 2014/0073363 A1 | 3/2014 | Tidd et al. | |
| 2014/0082509 A1 | 3/2014 | Roumeliotis et al. | |
| 2014/0118113 A1 | 5/2014 | Kaushik et al. | |
| 2014/0122040 A1 | 5/2014 | Marti | |
| 2014/0128103 A1 | 5/2014 | Joao et al. | |
| 2014/0129266 A1 | 5/2014 | Perl et al. | |
| 2014/0162693 A1 | 6/2014 | Wachter et al. | |
| 2014/0164761 A1 | 6/2014 | Kufluk et al. | |
| 2014/0188614 A1* | 7/2014 | Badenhop | H04L 67/20 705/14.58 |
| 2014/0207509 A1 | 7/2014 | Yu et al. | |
| 2014/0228060 A1 | 8/2014 | Abhyanker | |
| 2014/0244332 A1 | 8/2014 | Mermelstein | |
| 2014/0256357 A1 | 9/2014 | Wang et al. | |
| 2014/0257991 A1 | 9/2014 | Christensen et al. | |
| 2014/0278054 A1 | 9/2014 | Tidd et al. | |
| 2014/0292481 A1 | 10/2014 | Dumas et al. | |
| 2014/0342760 A1 | 11/2014 | Moldaysky et al. | |
| 2015/0035644 A1 | 2/2015 | June et al. | |
| 2015/0038171 A1 | 2/2015 | Uilecan et al. | |
| 2015/0052460 A1 | 2/2015 | Mohammad Mirzaei et al. | |
| 2015/0058133 A1 | 2/2015 | Roth et al. | |
| 2015/0080014 A1 | 3/2015 | Ben-Yosef et al. | |
| 2015/0100398 A1 | 4/2015 | Narayanaswami et al. | |
| 2015/0127445 A1 | 5/2015 | Jaffee | |
| 2015/0176997 A1* | 6/2015 | Pursche | G08G 1/0967 340/905 |
| 2015/0181384 A1 | 6/2015 | Mayor et al. | |
| 2015/0222935 A1 | 8/2015 | King et al. | |
| 2015/0233715 A1 | 8/2015 | Xu et al. | |
| 2015/0237473 A1* | 8/2015 | Koepke | H04W 4/021 455/456.3 |
| 2015/0241238 A1 | 8/2015 | Bass | |
| 2015/0242890 A1 | 8/2015 | Bass et al. | |
| 2015/0244725 A1 | 8/2015 | Ziskind | |
| 2015/0262086 A1 | 9/2015 | Mader et al. | |
| 2015/0262216 A1 | 9/2015 | Aziz et al. | |
| 2015/0296347 A1 | 10/2015 | Roth | |
| 2015/0334569 A1 | 11/2015 | Rangarajan et al. | |
| 2015/0334676 A1 | 11/2015 | Hart et al. | |
| 2016/0005003 A1 | 1/2016 | Norris et al. | |
| 2016/0050526 A1 | 2/2016 | Liu et al. | |
| 2016/0063537 A1 | 3/2016 | Kumar | |
| 2016/0105644 A1* | 4/2016 | Smith | H04N 5/23206 348/159 |
| 2016/0127351 A1 | 5/2016 | Smith et al. | |
| 2016/0150370 A1 | 5/2016 | Gillespie et al. | |
| 2016/0242010 A1 | 8/2016 | Parulski et al. | |
| 2016/0321548 A1 | 11/2016 | Ziskind | |
| 2016/0323708 A1 | 11/2016 | Sahadi | |
| 2017/0010119 A1 | 1/2017 | Bass | |
| 2017/0011348 A1 | 1/2017 | Ziskind | |

(56) References Cited

U.S. PATENT DOCUMENTS

| | | | |
|---|---|---|---|
| 2017/0162006 | A1 | 6/2017 | Sahadi |
| 2017/0248438 | A1 | 8/2017 | Bass |

FOREIGN PATENT DOCUMENTS

| | | |
|---|---|---|
| WO | WO 2015/017442 | 2/2015 |
| WO | WO 2015/130969 | 9/2015 |
| WO | WO 2015/130971 | 9/2015 |
| WO | WO 2016/172731 | 10/2016 |
| WO | WO 2016/176506 | 11/2016 |
| WO | WO 2016/179098 | 11/2016 |

OTHER PUBLICATIONS

Krueger, Robert; Thom, Dennis; Ertl, Thomas; "Visual Analysis of Movement Behavior using Web Data for Context Enrichment" Institute for Visualization and Interactive Systems (VIS), Published in *Pacific Visualization Symposium (Pacific Vis), 2014 IEEE*, pp. 193-200.IEEE, 2014.
Sim, Robert; Dudek, Gregory; "Effective Exploration Strategies for the Construction of Visual Maps", Centre for Intelligent Machines, Published in: Intelligent Robots and Systems, 2003. (IROS 2003). Proceedings. 2003 IEEE/RSJ International Conference on (vol. 4) Date of Conference: Oct. 27-31, 2003.
PCT Application No. PCT/US2004/12667, International Search Report dated Oct. 29, 2004.
PCT Application No. PCT/US2015/017827, International Search Report and Written Opinion dated Jun. 11, 2015.
PCT Application No. PCT/US2015/017829, International Search Report and Written Opinion dated Jun. 8, 2015.
U.S. Appl. No. 14/632,872 Office Action dated Mar. 7, 2016.
U.S. Appl. No. 14/633,019 Office Action dated May 6, 2016.
U.S. Appl. No. 14/633,019 Final Office Action dated Nov. 10, 2016.
U.S. Appl. No. 15/383,710, Scott S. Sahadi, Wearable Device, filed Dec. 19, 2016.
PCT/US16/67582, Wearable Device, Dec. 19, 2016.
U.S. Appl. No. 14/633,015, Benjamin H. Ziskind, Venue Notifications, filed Feb. 26, 2015.
PCT/US16/29260, Targeted Venue Message Distribution, Apr. 25, 2016.
U.S. Appl. No. 15/144,359, Scott S. Sahadi, Map Based Beacon Management, filed May 2, 2016.
PCT/US16/30424, Map Based Beacon Management, May 2, 2016.
U.S. Appl. No. 15/141,780, Benjamin H. Ziskind, Intelligent Prediction of Queue Wait Times, filed Apr. 28, 2016.
PCT/US16/29880, Intelligent Prediction of Queue Wait Times, Apr. 28, 2016.
PCT Application No. PCT/US2016/029260, International Search Report and Written Opinion dated Jul. 27, 2016.
PCT Application No. PCT/US2016/029880, International Search Report and Written Opinion dated Jul. 27, 2016.
PCT Application No. PCT/US2016/030424, International Search Report and Written Opinion dated Jul. 29, 2016.
PCT Application No. PCT/US2016/067582, International Search Report and Written Opinion dated Mar. 17, 2017.
U.S. Appl. No. 14/633,015 Office Action dated Apr. 13, 2017.
U.S. Appl. No. 15/144,359 Office Action dated Apr. 5, 2017.
U.S. Appl. No. 15/271,087 Office Action dated Jun. 7, 2017.
U.S. Appl. No. 15/597,609 Office Action dated Jul. 10, 2017.
U.S. Appl. No. 14/632,884 Office Action dated May 19, 2017.
U.S. Appl. No. 15/383,710 Office Action dated Aug. 16, 2017.
U.S. Appl. No. 15/683,620, dated Aug. 22, 2017.

* cited by examiner

Front-end device 460

App Navigation 410

Survey Message Summary 415

Advertisement Info
Message Summary 420

Promotion (discount coupon)
Message Summary 425

Promotion (exclusive offer)
Message Summary 430

Promotion (discount coupon)
Message Summary 435

Promotion (discount coupon)
Message Summary 440

Map Location
Message Summary 445

Message Feed 405

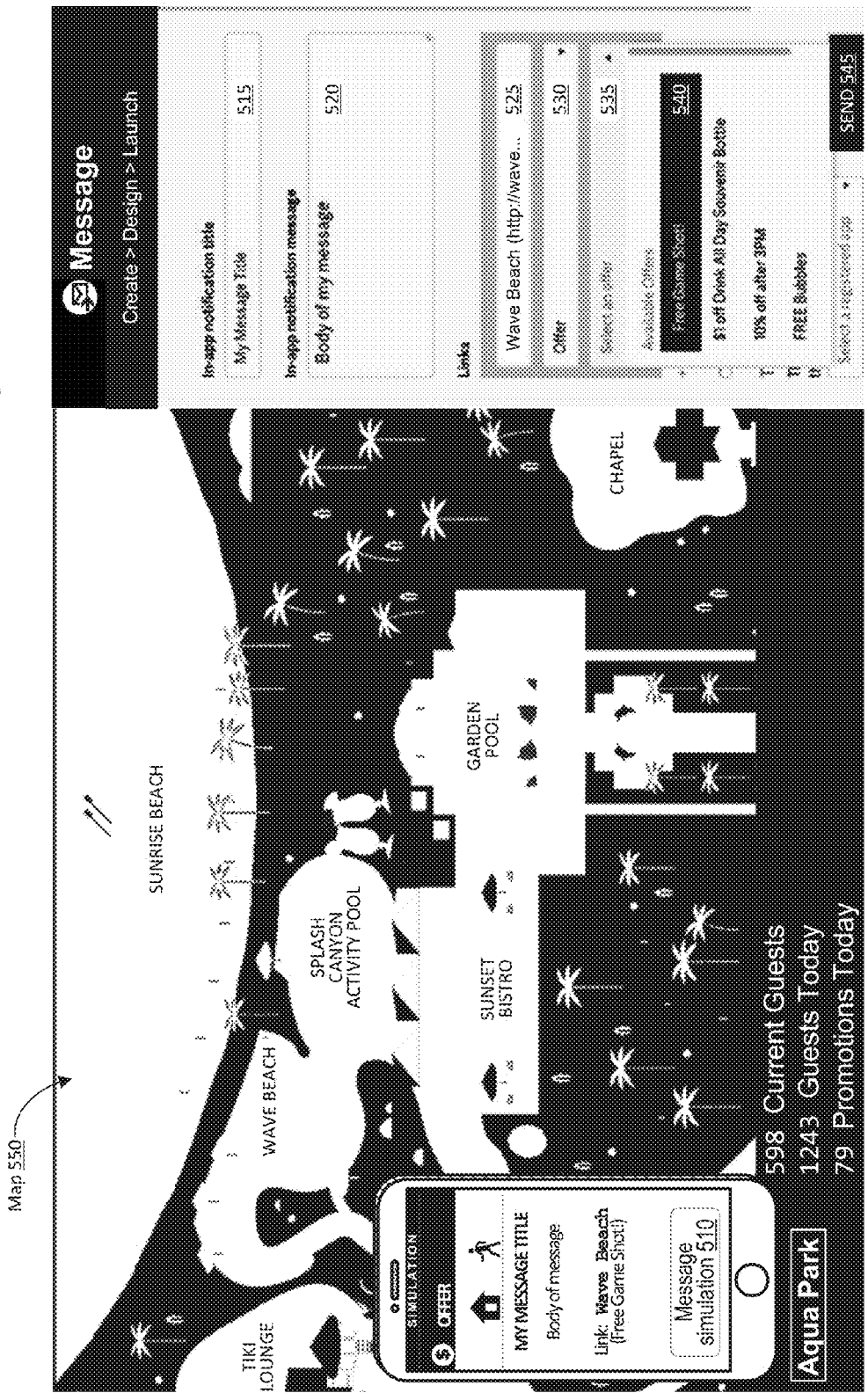

TARGETED VENUE MESSAGE DISTRIBUTION

CROSS-REFERENCE TO RELATED APPLICATIONS

The present application claims the priority benefit of U.S. provisional application No. 62/151,885 filed Apr. 23, 2015 and entitled "Generating a Message Campaign from an Administrative Console," which is hereby incorporated by reference.

BACKGROUND

1. Field of the Invention

The present invention is in the field of messaging. More particularly, the present invention is in the field of targeted delivery of contextual messaging to guests inside a venue.

2. Description of the Related Art

Entertainment and event venues such as theme parks, cruise ships, universities, arenas, concert venues, ski resorts, relaxation resorts, ice rinks, spas, skate parks, and stadiums typically have large numbers of visitors/guests and typically each have multiple "points of interest," corresponding to locations of attractions such as restaurants, cafeterias, concession stands, stores, libraries, theme park rides, theatre shows, movies circus/animal shows. Points of interest may also include locations of restrooms, water fountains, entrances, exits, or crossroads.

Typically, an entertainment venue wanting to send a message to its guests would need to send the message to all visitors at once, such as by sending a message to all registered ticket holders, students, staff, or the like. Such a message may not be relevant to all guests of the entertainment venue, but would be sent to all guests regardless.

Entertainment venues typically do not have access to information about each of their guests, such as the guest's identity as well as the guest's location (or proximity to points of interest) at any particular time of day. More generally, entertainment venues typically do not even know how many guests are within the venue at a given time.

There is a need for an improved way of managing venue information and using venue information to aid in targeted distribution of messages to guests in a venue.

SUMMARY OF THE PRESENTLY CLAIMED INVENTION

A first claimed embodiment of the present invention involves a method for message distribution associated with a venue and includes receiving information associated with a plurality of venue guests corresponding to a plurality of guest devices. The method also includes receiving a message, receiving targeting specifications identifying a trait shared among one or more targeted venue guests, and identifying the one or more targeted venue guests as a subset of the plurality of venue guests based on the targeting specifications and the received information. The method also includes transmitting the message to one or more targeted venue guest devices corresponding to the one or more targeted venue guests.

A second claimed embodiment of the present invention includes a communication transceiver, a memory, and a processor. The communication transceiver is communicatively coupled to at least a plurality of venue guest devices corresponding to a plurality of venue guests. The communication transceiver receives information associated with a plurality of venue guests, a message, and targeting specifications identifying a trait shared among one or more targeted venue guests. The processor may be coupled to the memory and to the communication transceiver. Execution of instructions stored in the memory by the processor performs system operations. The system operations include identifying the one or more targeted venue guests as a subset of the plurality of venue guests based on the targeting specifications and the received information. The system operations also include transmitting the message via the communication transceiver to one or more targeted venue guest devices corresponding to the one or more targeted venue guests.

A third-claimed embodiment of the present invention concerns a non-transitory computer-readable storage medium having embodied thereon a program executable by a processor to perform a method for message distribution associated with a venue. The method includes receiving information associated with a plurality of venue guests corresponding to a plurality of guest devices, receiving a message, and receiving targeting specifications identifying a trait shared among one or more targeted venue guests. The executable method also includes identifying the one or more targeted venue guests as a subset of the plurality of venue guests based on the targeting specifications and the received information. The executed method also includes transmitting the message to one or more targeted venue guest devices corresponding to the one or more targeted venue guests.

BRIEF DESCRIPTION OF THE DRAWINGS

FIG. 5A illustrates an administrative console user interface for generating a message.

DETAILED DESCRIPTION

An application server may receive, from an administrative console, a message and a targeting specification. The targeting specification identifies at least one trait (e.g., ticket type, age, gender) shared by a group of targeted venue guests. The group of targeted venue guests is a subset of the plurality of venue guests of a venue. The application server then uses information obtained from venue guest devices corresponding to venue guests to identify who belongs to the group targeted venue guests as well as their corresponding targeted venue guest devices. The application server then transmits a message to the targeted venue guest devices. The message may further be transmitted according to a schedule set or triggers by the administrator console. The schedule may identify dates and times within which messages should be sent, while the triggers may identify locations that may trigger messages.

Figure 1:
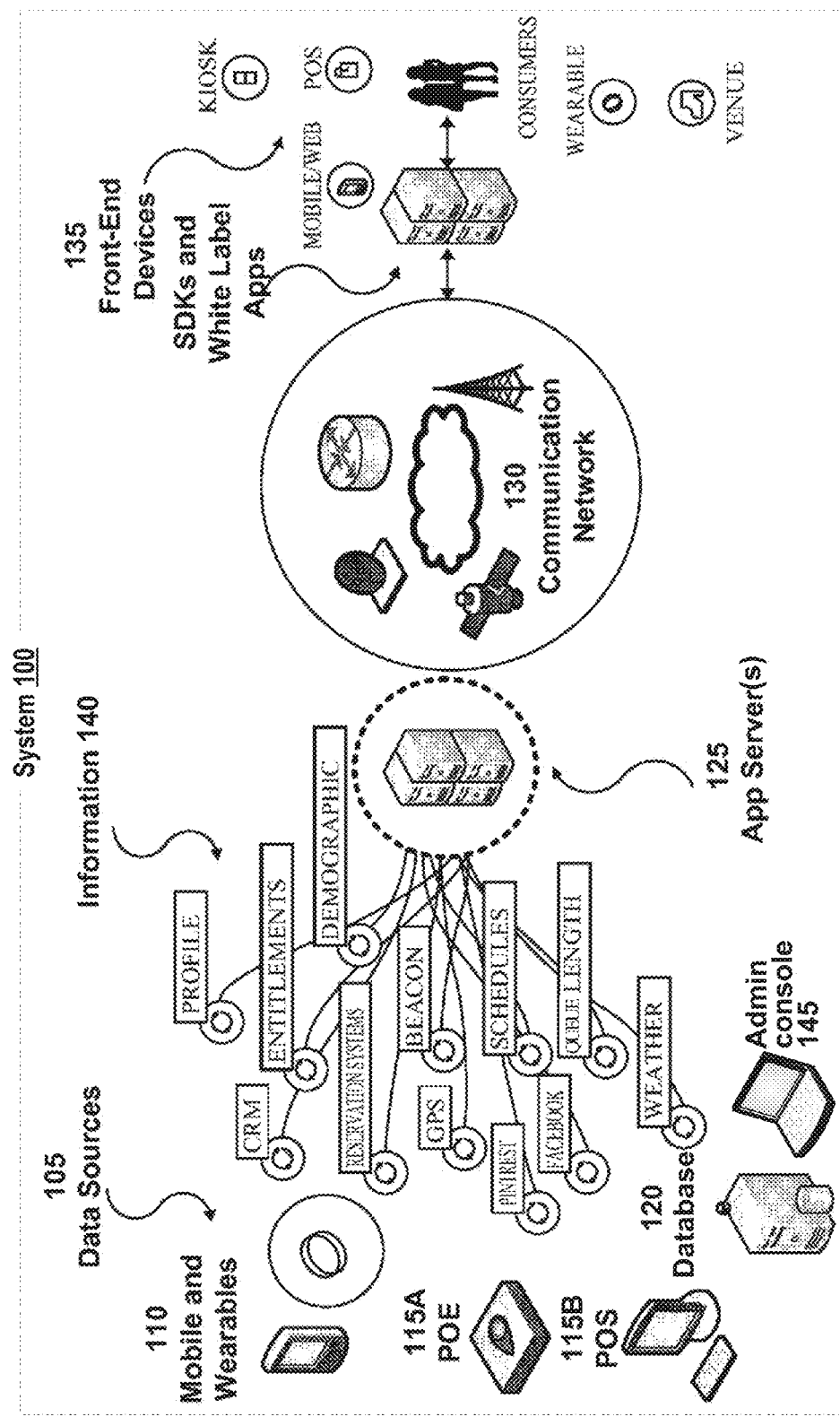
FIG. 1 is a block diagram of a messaging ecosystem.

FIG. 1 is a block diagram of a messaging ecosystem 100. The messaging ecosystem 100 may be used within a venue with multiple points of interest. The venue may be an entertainment venue or an event venues, which may for example be a theme park, a cruise ship, a school, a university, an arena, a concert venue, a ski resort, a relaxation resort, an ice rink, a shopping mall, a spa, a skate park, or a stadium. The points of interest of the venue may identify locations associated with attractions such as restaurants, cafeterias, concession stands, stores, libraries, theme park rides, theatre shows, movies circus shows, animal shows, or costumed characters. Points of interest may also include locations associated with restrooms, water fountains, entrances, exits, or crossroads. An area such as an attraction or a restroom may be associated with multiple points of interest, for example corresponding to entrances and exits, or to multiple points of sale (e.g., multiple cashiers or card readers).

At the center of the messaging ecosystem 100 is one or more application server(s) 125, which obtain information 140 from one or more data source(s) 105 and, via the communication network 130, transmits messages to one or more front-end device(s) 135 based on the information 140. The application server(s) 125 and data source(s) 105 may be located inside or outside the entertainment venue. The front-end devices 135 receiving the messages are generally located within the entertainment venue, but in some cases may be outside of it as well (e.g., a mobile device of a guest who is about to enter the entertainment venue).

The data sources 105 may include mobile devices 110 (including wearable devices), point-of-entry or point-of-exit terminals/beacons 115A, point-of-service terminals 115B (e.g., cash registers, credit card readers, electronic payment receivers), and database(s) 120. These data source(s) 105 may provide information 140 in the form of global positioning system (GPS) data or beacon proximity data (e.g., based on POE beacons 115A). The information 140 may also include social media data related to Facebook, Twitter, Instagram, Pinterest, Tumblr, or other social media accounts. Such social media data may include profile information, friend information, photos, message information, or some combination thereof. The information 140 may also include login information, guest settings, guest disability information, guest reservation status information, guest demographic information, entitlement information, customer relationship management (CRM) software information, weather information, queue length information, or some combination thereof. Any of these types of information may be used by the application server(s) 125 to target certain guests or groups of guests for delivery of messages.

The data sources 105 may also include information 140 from an administrator console 145 (e.g., which may in some cases be coupled to the database 120, or to a mobile device 110, or to a point of service terminal 115B, or to a point of entry/exit terminal 115A). The information 140 from the administrator console 145 may be generated via an administrator user interface such as those illustrated in FIG. 5A, FIG. 5B, and FIG. 5C, and may dictate the contents of a message sent to the front-end devices 135, defining a trigger for sending the message (e.g., a particular time/date, upon detecting that a device is entering/leaving a particular location or attraction), as well as defining what types of front-end devices 135 should receive the message (e.g., devices outside/within/entering/leaving a particular location, devices corresponding to a user that is part of a particular demographic, devices corresponding to a user with a particular gender or age other profile trait, or some combination thereof).

Figure 6:
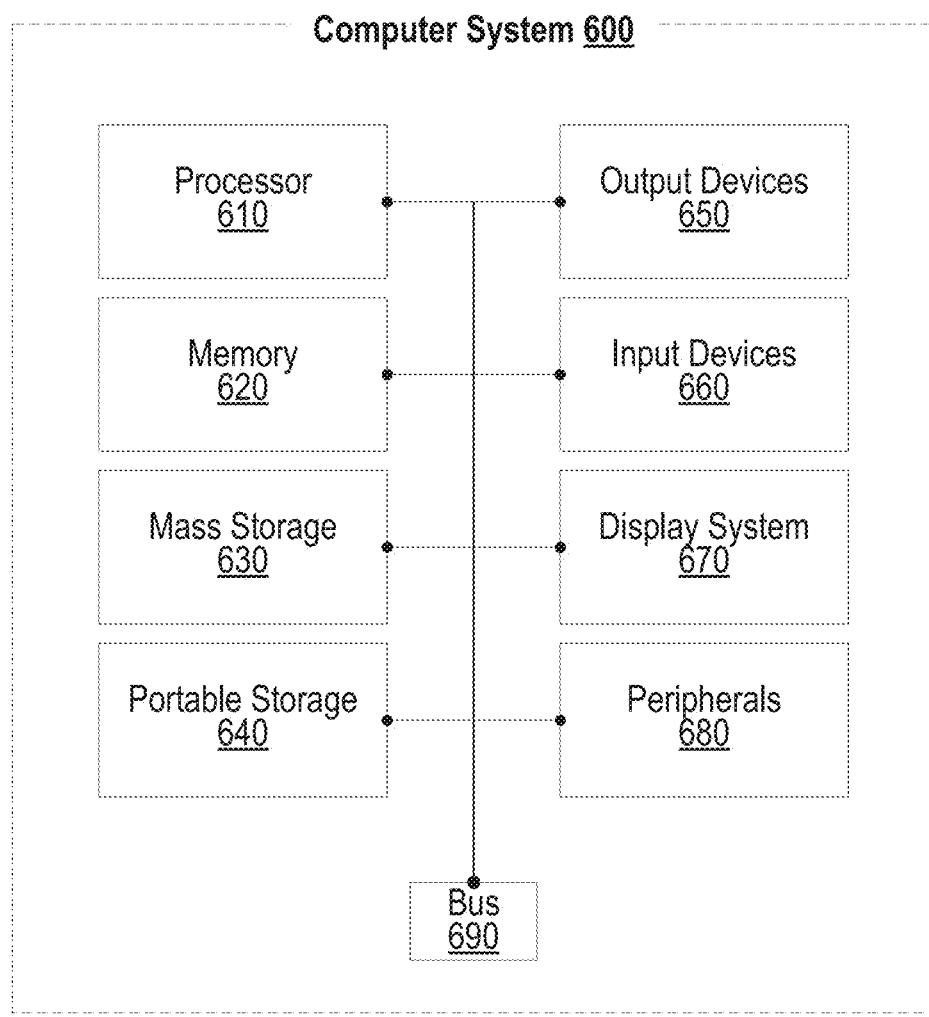
FIG. 6 is a block diagram of an exemplary computing device that may be used to implement an embodiment of the present invention.

A mobile device 110 of a guest of the entertainment venue may be both a data source 105 (e.g., by providing GPS/beacon location data and profile data to the application servers 125) and a front-end device 135 that receives messages transmitted by the application servers 125 over the communication network 130. Such a mobile device 110 may include one or more elements from a computer system 600 as illustrated in FIG. 6, or at least may include at least a subset of the components illustrated within the computer system 600 of FIG. 6.

The mobile device 110 may be a wearable device (also known as a "wearable"), meaning any type of mobile electronic device that can be worn on the body or attached to or embedded in clothes and accessories of an individual. Mobile devices 110 can execute an application (e.g., which may be embedded within an operating system, produced by a third party, or some combination thereof) that shares customer engagement information 140 with a venue's application server(s) 125. Such customer engagement data information 140 may include current and prior physical locale or customer wait times and travel times (e.g., how long was a customer at a particular point in a venue and how long did it take the customer to travel to a further point in a venue), paths to certain point on the map, and other information.

Processors and sensors associated with a mobile device 110 can gather, process, display, and transmit and receive information. In some cases, the mobile device 110 of a guest may in fact include multiple electronic devices, such as a wearable device wirelessly connected to a "smart" phone, wherein both the wearable device and the "smart" phone include sensors that help obtain information 140 that is then passed to the application server(s) 125. Both the wearable device and the "smart" phone can receive messages as front-end devices 135 in such a configuration.

POS data may be gathered at a sales terminal 115 that may interact with a mobile or wearable device 110 to track customer purchase history at a venue or preference for engagement at a particular locale within the venue. POE terminals 115 may provide data related to venue traffic flow, including entry and exit data that can be inclusive of time and volume. POE terminals 115 may likewise interact with mobile and wearable devices 110.

Historical data may also be accessed at databases 120 as a part of the application server 125 processing operation. The results of a processing or normalization operation may likewise be stored for later access and use. Processing and normalization results may also be delivered to front-end applications (and corresponding application servers) that allow for the deployment of contextual experiences and provide a network of services to remote devices as is further described herein.

The present system 100 may be used with and communicate with any number of external front-end devices 135 by way of communications network 130. Communication network 130 may be or include an "intranet," e.g., a personal area network (PAN), a local area network (LAN), a wireless local area network (WLAN), a municipal area network (MAN), a wide area network (WAN), or some combination thereof. In some cases, the communication network 130 may include Internet connectivity. Communication network 130 may include a variety of connected computing devices that provide one or more elements of a network-based service. The communications network 130 may include actual server hardware or virtual hardware simulated by software running on one or more actual machines thereby allowing for software controlled scaling in a cloud environment.

Communication network 130 allows for communication between data sources 105 and front-end devices 135 via any number of various communication paths or channels that collectively make up network 130. Such paths and channels may operate utilizing any number of standards or protocols including TCP/IP, 802.11, Bluetooth, GSM, GPRS, 4G, and LTE. Communications network 130 may be a local area network (LAN) that can be communicatively coupled to a network and/or the Internet operating through one or more network service provider(s).

Information received and provided over communications network 130 may be based on (or come from) other information systems such as the global positioning system (GPS), cellular service providers, or third-party service providers such as social networks. The system 100 can measure location and proximity using hardware on a user device (e.g., GPS) or collect the data from fixed hardware and infrastructure such as Wi-Fi positioning systems and Radio Frequency ID (RFID) readers. An exemplary location and proximity implementation may include a Bluetooth low-energy beacon with real time proximity detection that can be correlated to latitude/longitude measurements for fixed beacon locations.

Additional use cases may include phone-based, GPS, real-time location (latitude/longitude) measurements, phone geo-fence real time notifications when a device is moving into or out of location regions, Wi-Fi positioning involving user location detection based on Wi-Fi signal strength (both active or passive), RFID, Near Field Communication (NFC), and cellular tower positioning involving wide range detection of user device location, which may occur at the metro-level.

Front-end devices 135 are inclusive of kiosks, mobile devices, wearable devices, venue devices, captive portals, digital signs, and POS and POE devices. It should be noted that each of these external devices may be used to gather information about one or more consumers at a particular location during a particular time. Thus, a device that is providing information to a customer on the front-end (i.e., a front-end device 135) such as a mobile device executing an application or a specially designed wearable can also function as a data source 105 as described above.

The ecosystem 100 of FIG. 1 provides services to connect venue management with visitors and entertainment consumers while simultaneously providing a messaging platform for consumers. For example, the social network of a consumer may be extended into a map and the physical world associated with the map. Services to extend the social network of a user include finding friends, coordinating rally points, management of proximity based parental controls, serendipitous discovery, and customization and sharing of photos. Venue management may provision consumers with badges, points and rewards, coordinate scavenger hunts and competitions, and provide leaderboard and trivia services. Consumers may also be engaged by collecting feedback and reviews of their experiences, managing favorites and wish lists, conducting surveys and interactive voting, and through the display of messages.

Figure 2:
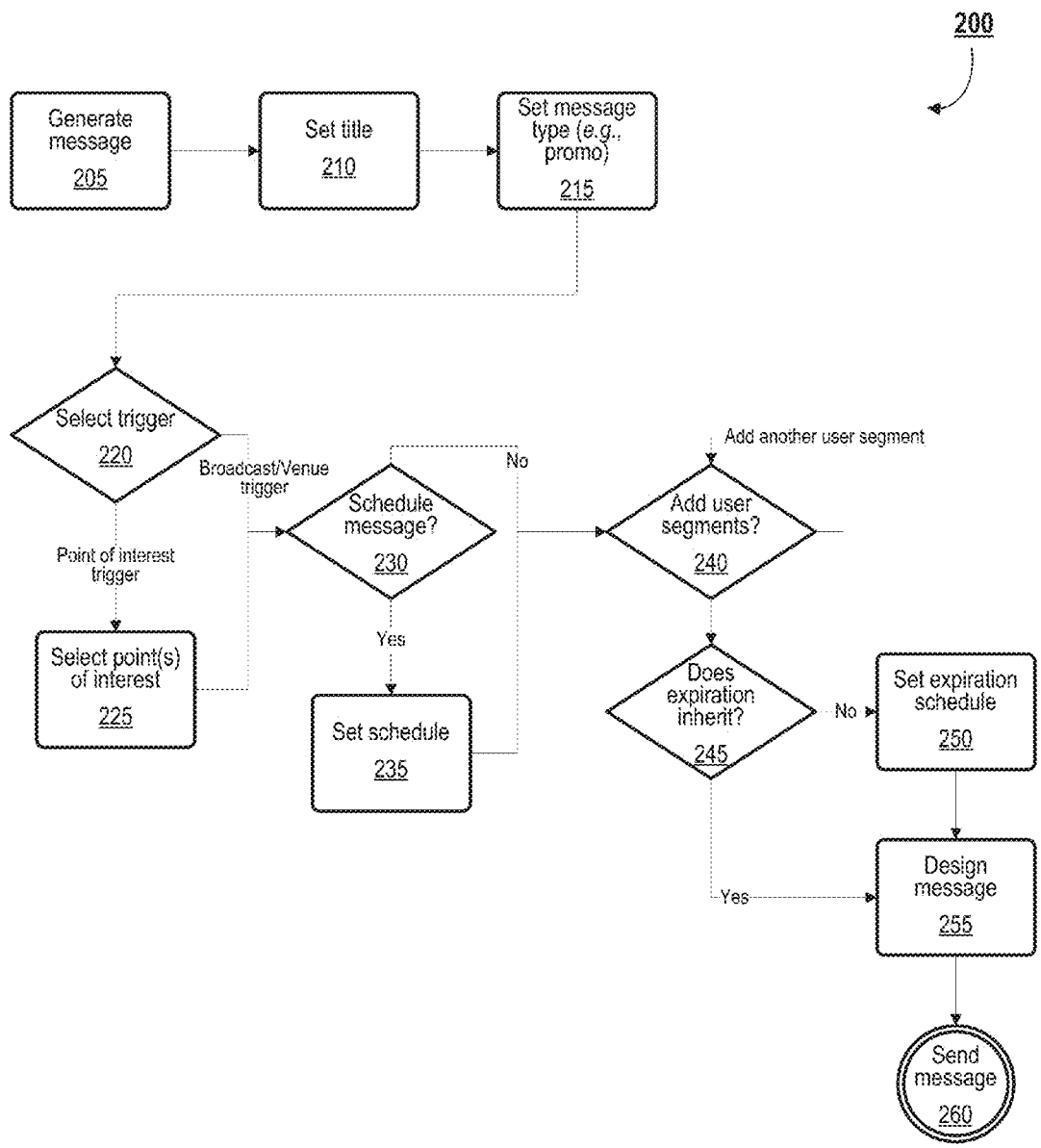
FIG. 2 is a flow diagram illustrating exemplary operations for organizing targeted delivery of messages based on administrator console inputs.

FIG. 2 is a flow diagram illustrating exemplary operations 200 for organizing targeted delivery of messages based on administrator console inputs.

A promotional message may be generated (e.g., automatically, according to user administrator input via admin console user interface, or some combination thereof) at step 205. The message may include text (e.g., optionally including hyperlinks), graphics (e.g., including images, GIF animations, video), and other media (e.g., audio, document files).

A title for the message may be set (e.g., automatically, according to user administrator input via admin console user interface, or some combination thereof) at step 210. The title may be unique for the particular venue. In some instances, the title may only be permitted to be used by a particular administrative console (e.g., such as when the title includes a name of the entertainment venue or of an entertainer at the entertainment venue).

A message type may be selected at step 215. Examples of message type include an alert (e.g., of an emergency, of an upcoming attraction, of an attraction closure, or an attraction queue wait time), an offer (e.g., discount, exclusive availability), and product message (e.g., advertising an upcoming attraction). A trigger may be selected at step 220.

The trigger of step 220 may include broadcasting, multicasting, or unicasting (e.g., direct messaging) the message to guests who are currently inside the venue, who are currently entering or have recently entered the venue, who are currently exiting or have recently exited the venue, guests who are currently near a particular point of interest (POI), guests who are currently nearing or have recently come into the vicinity of a particular point of interest (POI), guests who are currently leaving or have recently left the vicinity of a particular point of interest (POI), or some combination thereof. The trigger of step 220 may also include a time component, such as broadcasting the message at a particular time of day (e.g., according to a clock, according to a countdown timer, according to a count-up timer, according to a daily occurrence such as sunrise or sunset, according to a calendar date, or some combination thereof). If the trigger(s) selected in step 220 include trigger(s) based on one or more points of interest, these may be selected at step 225.

A point of interest may be an attraction or particular location within a venue such as a restaurant, cafeteria, concession stand, store, library, or theme park ride. Points of interests may also be specific locations for the occurrence of a one-off event or "flash" event such as a special one-time guest appearance or the like. Each attraction may include multiple points of interest (e.g., separate points of interest for an entrance and for an exit). The point of interest may correspond to a location within the event venue that includes a hardware beacon that can help identify nearby devices via a wireless protocol (e.g., Bluetooth, 802.11 Wi-Fi, near-field-communication, radio-frequency identification).

A determination as to whether a message should be scheduled is determined at step 230. The schedule may include a date range, days of week, time sent, and other scheduling information for sending the message. A schedule, if desired, may be configured at step 235.

In some instances, the configuration of the schedule may be different for "broadcast" messages that might be sent to all or a larger group at a particular time or date, compared to "triggered" messages that are triggered by a certain detected situation. Some messages might be some combination of broadcast messages and triggered messages. Trigger messages might be triggered, for example, by a guest's arrival at the venue, by the guest's exit from the venue, by the guest's arrival at a point of interest, by the guest's exit from a point of interest, by the guest staying at a point of interest for a predetermined period of time, by an estimated or actual wait time at a particular point interest (e.g., a promotion coupon message as a reward for waiting in line or a timed promotion coupon to incentivize leaving the line), estimated future wait times at a point of interest, or a combination of multiple trigger rules (e.g., a message might be triggered by a guest arriving at an identified first point of interest, spending at least a predetermined amount of time at the first point of interest, and then arriving at an identified second point of interest). Broadcast messages may occur at a specific time of day (e.g., anyone inside the venue at 2 pm). Triggers may likewise be tied to a time-range (e.g., anyone who leaves a particular point of interest between 2-4 pm). The trigger and scheduling rules described above may be used for targeting guests so that all guests fulfilling such conditions should be sent a particular message (e.g., all guests leaving a particular amusement park ride are recommended a similar ride elsewhere in the venue), or a random fraction of guests fulfilling such conditions (e.g. a random one-fourth of the guests at a certain point of interest receive a coupon promotion message for a nearby restaurant). Various combinations of scheduled broadcast and triggers are possible in organizing delivery of a particular message. For example, a guest coming near a restaurant point of interest within an evening time range may receive a message identifying dinner promotions, whereas the same guest coming near the same restaurant point of interest at an afternoon or morning time range might instead receive a message identifying lunch or breakfast promotions.

A determination is made at step 240 as to whether any user segments should be added as recipients to the message. These might include guest demographics, guests located in certain areas, guests entering into certain areas, guests exiting from certain areas. If no further user segments should be added, a determination is made as to whether an expiration time and/or date of the message is inherited (e.g., from another message) at step 245. This might include how long a promotion in the message is valid for, or for how long the message is relevant and appears in an inbox or message feed of a receiving front-end device.

Expiration time is set at step 250. Regardless of whether the expiration time/date is determined by the administrator console 145 in step 250 or inherited automatically at step 245, the design of the message determined at step 255. This design may occur automatically, via input at the administrator console 145, or some combination thereof. The message is sent at step 260.

Figure 3B:
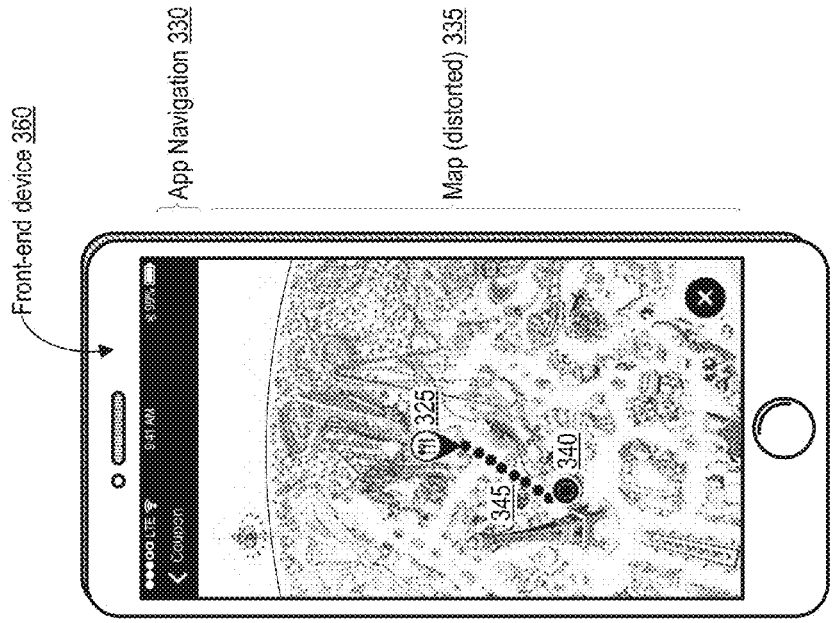
FIG. 3B illustrates a distorted map user interface providing directions from a user location to the restaurant location.
Figure 3A:
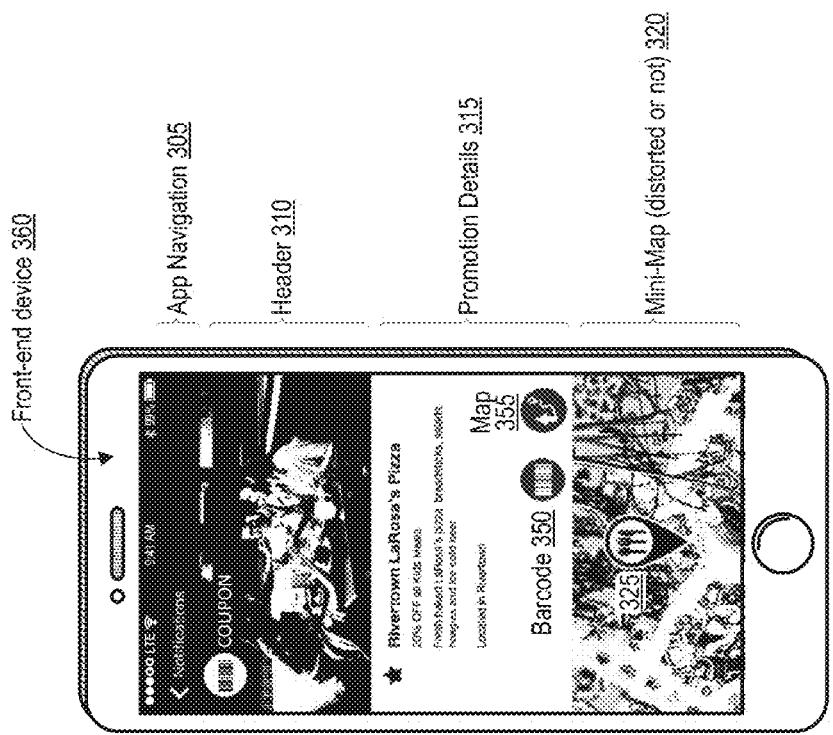
FIG. 3A illustrates a promotional message user interface associated with a restaurant, the promotional message including a map view of the restaurant location.

FIG. 3A illustrates an promotional message user interface associated with a restaurant. As illustrated, the promotional message includes a map view of the restaurant location. The promotional message user interface is illustrated being displayed via a display screen of an exemplary front-end device 360 such as a cellular phone and/or portable media player device.

The promotional message user interface includes a header 310, which in the case of the promotional message of FIG. 3A, identifies that the promotional message includes a coupon with a barcode. The header 310 also includes an image of a restaurant full of patrons eating food.

The promotional message user interface also includes a "promotional details" section 315. As illustrated here, the promotional coupon in question is valid for "20% off all kids meals" at the restaurant "Rivertown LaRosa's Pizza," which is "Located in Rivertown" and sells "fresh baked LaRosa's pizza, breadsticks, salads, hoagies, and ice cold beer." The "promotional details" section 315 includes a "barcode" button 350 which, when pressed/touched, can trigger a barcode to be displayed via the display screen of the front-end device 360 and that can then be scanned by staff at the entertainment venue. Display of the code might be a traditional one-dimensional barcode or a two-dimensional quick-response "QR" code. The "promotional details" section 315 includes a "map" button 355 which, when pressed/ touched, can trigger display of the distorted map user interface of FIG. 3B.

The promotional message user interface also includes a "mini-map" section 320. This section includes a marker 325 identifying the location of "Rivertown LaRosa's Pizza" within the event venue. The mini-map may be distorted as described with respect to the distorted map 335 of FIG. 3B. The map may also be entirely to scale. The promotional message user interface includes an application navigation bar 305 with a "notifications" button, allowing a guest to transition to a notification user interface such as the one illustrated in FIG. 4.

FIG. 3B illustrates an distorted map user interface providing directions from a user location to the restaurant location. The distorted map user interface is illustrated being displayed via a display screen of an exemplary front-end device 360 (e.g., a cellular phone and/or portable media player device). The distorted map user interface of FIG. 3B includes a map 335, which includes a marker 325 identifying the location of "Rivertown LaRosa's Pizza" within the event venue. The map as illustrated also includes a second marker 340 identifying the location of a guest associated with the front-end device 360. The map as illustrated here also includes an illustrated line 345 identifying a path that the guest could take to reach the marked location 325 of "Rivertown LaRosa's Pizza."

The map 335 of FIG. 3B is distorted in that it is not illustrated entirely to scale. In particular, certain areas may be illustrated at a closer scale (i.e., more "zoomed in") than other areas. This differs from a "pinch and zoom" implementation that is popular in many mapping solutions or mobile devices. This distorted implementation automatically zooms in on relevant mapping areas and can adjust if a user were to manipulate the map area in order to best focus on the relevant area regardless of overall map scale.

For example, in the map 335 of FIG. 3B, an area including the guest location marker 340 and the restaurant location marker 325 is illustrated at a closer "more zoomed in" scale (e.g., a 1:10 scale). Areas of the entertainment venue that are farther away from the guest location marker 340 and the restaurant location marker 325 are illustrated at a farther "more zoomed out" scale (e.g., a 1:100 scale). Each "area" may be of uniform scale, or may have a gradual increase/ decrease in scale internally, or some combination thereof.

For example, an area including guest location marker 340 and restaurant location marker 325 could gradually have a farther "more zoomed out" scale towards the edges of the area. The areas could be segmented internally as well—for example, a sub-area including the guest location marker 340 may be illustrated at a closer scale (e.g., a 1:5 scale) than an area including the restaurant location marker 325 (e.g., a 1:15 scale), or vice versa. It should be noted that while FIG. 3B illustrates the map 335 as distorted, in some cases, it may instead be an ordinary map (i.e., entirely at one scale). The distorted map user interface of FIG. 3B also includes an app navigation bar 330 with a "coupon" button, allowing a guest to transition to the promotional message user interface of FIG. 3A.

Figure 4:
FIG. 4 illustrates a notification user interface identifying multiple messages.

FIG. 4 illustrates an notification user interface identifying multiple messages. The message feed user interface is illustrated being displayed via a display screen of an exemplary front-end device 460 (e.g., a cellular phone and/or portable media player device). While front-end device 460 of FIG. 4 is illustrated in an exaggerated manner with a vertically lengthy display, it should be understood that the proportions of the front-end device 460 could be closer to those of exemplary front-end device 360, and that the notification user interface of FIG. 4 could include a scroll bar or other scrolling mechanism to scroll through the notification user interface of FIG. 4, for example via touchscreen gestures (e.g., swipes), mouse movements, mouse clicks, scroll wheel/ball movements, or some combination thereof.

The notification user interface of FIG. 4 includes a message feed 405 that lists summaries such as shortened versions or headers portions such as header 310 of FIG. 3A of various types of messages. These might include survey messages (e.g., message summary 415), advertisement/informational messages (e.g., message summary 420), and promotional discount coupon messages (e.g., message summary 425. Summaries may also include message summary 435, message summary 440, promotional exclusive offer messages such as message summary 430, and map location messages like message summary 445, which identifies a "white water canyon" location 450.

Each message summary identifies an expiration time, ranging from a number of minutes (e.g., message summary 440, message summary 445), to a number of hours (e.g., message summary 425, message summary 430, message summary 435), and ultimately to a number of days (e.g., message summary 415, message summary 420, message summary 425). Each of these message summaries can be interacted with (e.g., via a mouse click or a touchscreen touch or gesture) and thereby expanded into a full message. For example, the promotional discount coupon message summary 435, which is similar to header 310 of FIG. 3A, may be touched/clicked to expand into the promotional message user interface of FIG. 3A.

FIG. 5A illustrates an administrative console user interface for generating a message. The administrative console user interface of FIG. 5A includes a map 550 illustrating the entertainment venue ("Aqua Park"). The administrative console user interface also includes a message simulation 510 filled in with details based on the fields on the right-hand side, the fields including a message title field 515 ("My Message Title"), an in-app notification message field 520 ("Body of my message"), a link identifier field 525 ("Wave Beach" with a URL corresponding to the "wave beach" location on the map 550), a link type field 530 ("offer"), and a link sub-type field 535, under which a drop-down menu specifies that the selected offer 540 is "Free Game Shot!"

Draft messages can be marked with "Draft" status and either a complete button or a send button 545. A 'complete' button may appear if the draft contains missing/incorrect information, such as empty fields or a schedule containing dates in the past. A "send" button 545 appears in FIG. 5A, allowing the administrator to send the message as it appears in the message simulation 510.

Figure 5B:
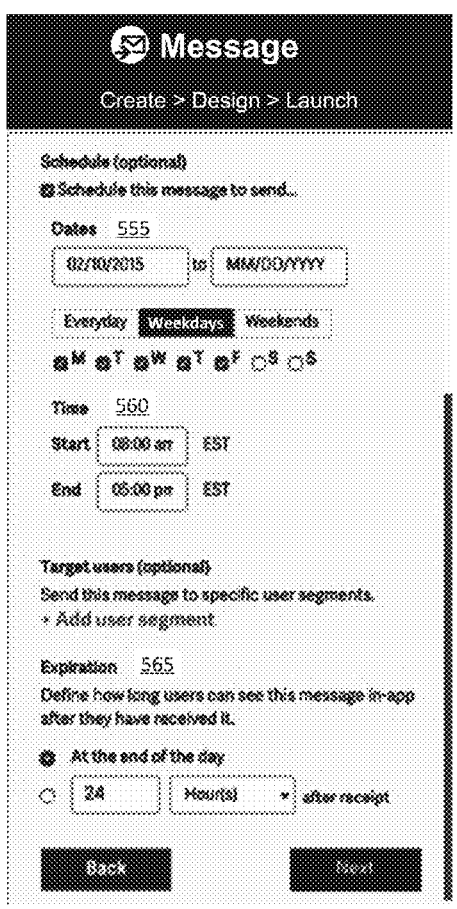
FIG. 5B illustrates an administrative console user interface for scheduling delivery of a message.

FIG. 5B illustrates an administrative console user interface for scheduling delivery of a message. The administrative console user interface of FIG. 5B is illustrated without the map 550 or message simulation 510 of FIG. 5A, but it should be understood that one or both of these elements may be included in some embodiments.

The administrative console user interface of FIG. 5B allows an administrator to schedule a message (e.g., the message of message simulation 510 of FIG. 5A) to be sent according to a schedule. The schedule of FIG. 5B is defined by dates 555 (e.g., from Feb. 10, 2015 to an unspecified date), days of the week (e.g., weekdays), and times 560 (e.g., from 8:00 A.M. to 5:00 P.M.). Messages sent according to the schedule of FIG. 5B have a defined expiration time 565 (e.g., the end of the day).

Messages scheduled for delivery may be marked with the "Scheduled" status and their active dates on the manage screen. Previously launched, unscheduled messages may be marked as "Ready." The last updated time will show the last time the message was sent out or had its schedule changed.

Figure 5C:
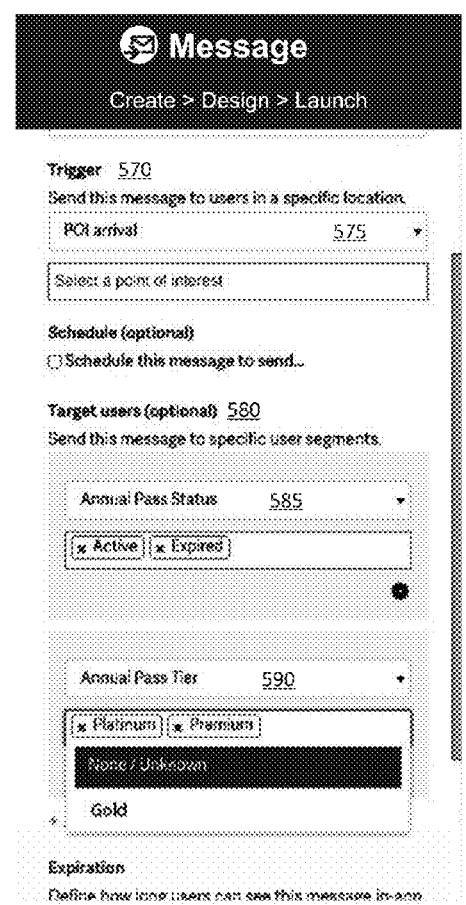
FIG. 5C illustrates an administrative console user interface for targeting delivery of a message.

FIG. 5C illustrates an administrative console user interface for targeting delivery of a message. The administrative console user interface of FIG. 5C is illustrated without the map 550 or message simulation 510 of FIG. 5A. It should be understood, however, that one or both of these elements may be included in some embodiments.

The administrative console user interface of FIG. 5C allows an administrator to define a trigger 570 for the message (e.g., the message of message simulation 510 of FIG. 5A). In FIG. 5C, the trigger 570 is a guest's arrival at a point of interest (i.e., "POI arrival" 575). A field underneath field 575 allows the administrator to select a point of interest.

The administrative console supports user-triggered messages via, for example, Venue Entry, Venue Exit, and Point of Interest arrival. To schedule triggered messages, an administrator may select a time range, days of the week and date range for the message to automatically send. For example, a message may have a schedule from 12 to 2 pm on weekends from January 1st through January 15th.

Scheduling a triggered message need not change the status or delivery of other messages associated with that trigger. Since messages may be targeted to different user segments, multiple messages may be active the same time. When a scheduled message activates, it will be delivered alongside any other active messages until its schedule expires, is changed or is deactivated.

All triggered messages currently being sent to users are marked with the "Active" status on the Manage screen. Messages scheduled for delivery at a later time are marked with "Scheduled" and their date range. Messages not actively sending to users are marked as "Inactive." Deactivating a scheduled message will remove its schedule and change its status to Inactive.

The administrative console user interface of FIG. 5C allows an administrator to target a message (e.g., the message of message simulation 510 of FIG. 5A) to one or more specific user segment(s) 580. For example, a first targeting field 585 identifies that the administrator wishes to target the message toward guests having either an active annual pass or an expired annual pass. A second targeting field 590 identifies that the administrator wishes to target the message toward guests whose annual passes are/were "platinum" tier or "premium" tier rather than "gold" tier.

As old messages accumulate, an administrator may archive messages they will no longer send out. This will hide them from view but still make them available for reporting. Triggered messages are in-app and push notifications sent to individual users when they enter or leave an area.

FIG. 6 illustrates an exemplary computing system 600 that may be used to implement an embodiment of the present invention. For example, any of the computer systems or computerized devices described herein may, in at least some cases, be a computing system 600 and/or include at least a subset of the components illustrated in FIG. 6. The computing system 600 of FIG. 6 includes one or more processors 610 and memory 610. Main memory 610 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 610 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD), a plasma display, an organic light-emitting diode (OLED) display, an electronic ink display, a projector-based display, a holographic display, or another suitable display device. Display system 670 receives textual and graphical information, and processes the information for output to the display device. The display system 670 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 600 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 600 may be part of a multi-computer system that uses multiple computer systems 600 (e.g., for one or more specific tasks or purposes). For example, the multi-computer system may include multiple computer systems 400 communicatively coupled together via one or more private networks (e.g., at least one LAN, WLAN, MAN, or WAN), or may include multiple computer systems 600 communicatively coupled together via the internet (e.g., a "distributed" system), or some combination thereof.

While various flow diagrams provided and described above may show a particular order of operations performed by certain embodiments of the invention, it should be understood that such order is exemplary (e.g., alternative embodiments may perform the operations in a different order, combine certain operations, overlap certain operations, etc.).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for message distribution associated with a previously defined venue area, the method comprising:
   receiving information associated with a plurality of venue guests located inside the previously defined venue area corresponding to a plurality of venue guest devices located inside the previously defined venue area;
   receiving a schedule;
   receiving an outgoing message;
   receiving targeting specifications identifying one or more traits shared among the plurality of venue guests located inside the previously defined venue area other than presence within the previously defined venue area, wherein the one or more traits include a shared ticket type, the shared ticket type being one of a plurality of ticket types; and
   transmitting the outgoing message to the plurality of venue guest devices corresponding to the plurality of venue guests within the previously defined venue area and corresponding to the targeting specifications at a time that is based on the received schedule.

2. The method of claim 1, wherein the schedule includes at least one of a start time or an end time.

3. The method of claim 1, wherein the schedule includes at least one of a start date or an end date.

4. The method of claim 1, wherein the schedule identifies days of the week during which the outgoing message is to be transmitted.

5. The method of claim 1, further comprising receiving a trigger dataset identifying a trigger, wherein transmitting the outgoing message to the plurality of venue guest devices is timed based the occurrence of the trigger.

6. The method of claim 5, wherein the trigger is based on detecting that the plurality of venue guest devices have entered a specified area.

7. The method of claim 5, wherein the trigger is based on detecting that the plurality of venue guest devices have exited a specified area.

8. The method of claim 1, wherein the one or more traits identified by the targeting specifications also include one of a gender, an age, a height, a weight, a hometown, a home state, a current location, a current vicinity, a past location, a past vicinity, a purchase history, an attraction-visiting history, or some combination thereof.

9. The method of claim 1, further comprising selecting an outgoing message type, wherein transmitting the outgoing message to the plurality of venue guest devices include transmitting an outgoing message type identifier identifying the selected outgoing message type.

10. A system for outgoing message distribution associated with a previously defined venue area, the system comprising:
a communication transceiver communicatively coupled to at least a plurality of venue guest devices located inside the previously defined venue area corresponding to a plurality of venue guests located inside the previously defined venue area, wherein the communication transceiver receives information associated with the plurality of venue guests, wherein the communication transceiver also receives an outgoing message, wherein the communication transceiver also receives targeting specifications identifying one or more traits shared among the plurality of venue guests located inside the previously defined venue area other than presence within the previously defined venue area, wherein the one or more traits include a shared ticket type, the shared ticket type being one of a plurality of ticket types, wherein the communication transceiver also receives a schedule;
a memory; and
a processor coupled to the memory and to the communication transceiver, wherein execution of instructions stored in the memory by the processor:
transmits the outgoing message via the communication transceiver the plurality of venue guest devices corresponding to the plurality of venue guests within the previously defined venue area and corresponding to the targeting specifications at a time that is based on the received schedule.

11. The system of claim 10, wherein the schedule includes at least one of a start time, an end time, a start date, an end date, or some combination thereof.

12. The system of claim 10, wherein the schedule identifies days of the week during which the outgoing message is to be transmitted.

13. The system of claim 10, wherein the communication transceiver is also communicatively coupled to an administrative console, and wherein the outgoing message and the targeting specifications are received from the administrative console.

14. The system of claim 10, wherein the information associated with a plurality of venue guests is received from the plurality of venue guest devices.

15. The system of claim 10, wherein the communication transceiver further receives a trigger dataset identifying a trigger, wherein transmitting the outgoing message to the plurality of venue guest devices is timed based the occurrence of the trigger.

16. The system of claim 15, wherein the trigger is based on detecting that the plurality of venue guest devices have performed an interaction associated with a specified area, wherein the interaction includes at least one of entering or exiting the specified area.

17. The system of claim 10, wherein the one or more traits identified by the targeting specifications also include one of a a gender, an age, a height, a weight, a hometown, a home state, a current location, a current vicinity, a past location, a past vicinity, a purchase history, an attraction-visiting history, or some combination thereof.

18. A non-transitory computer-readable storage medium, having embodied thereon a program executable by a processor to perform a method for outgoing message distribution associated with a previously defined venue area, the method comprising:
receiving information associated with a plurality of venue guests located inside the previously defined venue area corresponding to a plurality of venue guest devices located inside the previously defined venue area;
receiving a schedule;
receiving an outgoing message;
receiving targeting specifications identifying one or more traits shared among the plurality of venue guests located inside the previously defined venue area other than presence within the previously defined venue area, wherein the one or more traits include a shared ticket type, the shared ticket type being one of a plurality of ticket types; and
transmitting the outgoing message to the plurality of venue guest devices corresponding to the plurality of venue guests within the previously defined venue area and corresponding to the targeting specifications at a time that is based on the received schedule.

19. The method of claim 1, wherein the outgoing message includes a map including a marker identifying a location on the map, wherein the map is distorted so that a first map area that includes the marker is illustrated at a first map scale and a second map area that does not include the marker is illustrated at a second map scale that is different from the first map scale.

20. The method of claim 1, wherein shared ticket type corresponds to a type of pass, wherein the type of pass behaves as a ticket for a predetermined period of time.

* * * * *